(12) United States Patent
Smith

(10) Patent No.: US 7,917,447 B1
(45) Date of Patent: Mar. 29, 2011

(54) METHOD AND SYSTEM FOR PROVIDING A COMMUNITY OF INTEREST SERVICE

(75) Inventor: Donald E. Smith, Lexington, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1288 days.

(21) Appl. No.: 10/700,028

(22) Filed: Nov. 3, 2003

(51) Int. Cl.
*G06Q 99/00* (2006.01)
*G06Q 10/00* (2006.01)

(52) U.S. Cl. .......................... 705/319; 705/1.1

(58) Field of Classification Search ............... 705/1, 319
See application file for complete search history.

(56) References Cited

U.S. PATENT DOCUMENTS

| | | | | |
|---|---|---|---|---|
| 5,761,650 A | * | 6/1998 | Munsil et al. | 705/34 |
| 5,774,885 A | * | 6/1998 | Delfer, III | 705/401 |
| 7,159,178 B2 | * | 1/2007 | Vogt et al. | 715/733 |
| 2002/0032735 A1 | * | 3/2002 | Burnstein et al. | 709/204 |
| 2002/0077891 A1 | * | 6/2002 | Castle et al. | 705/14 |
| 2004/0080534 A1 | * | 4/2004 | Quach | 345/751 |
| 2004/0215559 A1 | * | 10/2004 | Rebenack et al. | 705/40 |
| 2004/0230676 A1 | * | 11/2004 | Spivack et al. | 709/223 |
| 2005/0068983 A1 | * | 3/2005 | Carter et al. | 370/480 |
| 2007/0226628 A1 | * | 9/2007 | Schlack | 715/733 |

OTHER PUBLICATIONS

"User Sues Yahoo! for Revealing Identity", Joan Walters, The Ottawa Citizen, May 12, 2000.*
"Billing Without Paper . . . or Billing Without Billers", Richard K. Crone, TMA Journal, vol. 18, Iss 1, Jan./Feb. 1998.*

* cited by examiner

*Primary Examiner* — Jonathan Ouellette

(57) ABSTRACT

Methods and systems are provided for facilitating communications among persons sharing a common interest. Customers of a telecommunications provider are notified about the service via a notification included in a billing statement. A customer uses the information to access a web site capable of registering the customer and connecting the customer to other persons sharing a common interest. The service assigns aliases to respective participants so that the true identity of each person is not made available to others in the group.

16 Claims, 7 Drawing Sheets

METHOD AND SYSTEM FOR PROVIDING A COMMUNITY OF INTEREST SERVICE

FIELD OF THE INVENTION

The disclosed methods and systems relate to communications systems and, more particularly, to network based communications among a group of users sharing at least one common interest.

DESCRIPTION OF THE PRIOR ART

The Internet has become ubiquitous in contemporary society. Along with proliferation of the Internet itself has come a seemingly endless supply of new applications and uses. One such use of the Internet is as an online communication forum among a group of users. These groups may take many forms, such as, for example, chat rooms, web based discussion forums, and email based forums. A user wishing to participate in a forum may be faced with certain obstacles, such as, for example, finding a group and protecting his true identity when participating in a group. While a group may comprise all users of the Internet, in most instances a user will want to communicate with a subset of Internet users, such as those having an interest in common with the user. For example, a user may be interested in gardening, horseback riding, cross-country skiing and cooking. This user may wish to find others on the Internet sharing one or more of these interests. A group of persons sharing at least one interest with the user is hereinafter referred to as a target group. The user may do an Internet based search using a search engine such as Google™, Dogpile™, MSN™, or the like in order to locate a target group. The problem with these generic searches is that the search criteria normally produce coarse results, in that they are not easily sorted using additional criteria to better focus the output of the search.

At times coarse results, such as finding anyone within a target group sharing an interest for a topic or subject, may satisfy the user. However, at other times the user may only wish to communicate or associate with persons sharing an interest and further satisfying additional search criteria. By way of example, a user may wish to communicate only with people having rose gardening as a hobby that also live in the same state as the user, since not all rose varieties thrive in all climates. In this example, geography was the additional criteria added to an otherwise general, or generic, search for rose gardening groups. Examples of other criteria which the user may want satisfied are, but are not limited to, gender, educational background, age, religious affiliation, affiliations with other organizations, etc. Performing these more complex searches using generally available Internet search engines may not meet the needs of Internet users.

Another potential shortcoming associated with online groups is that a user participating in the group may wish to have his true identity withheld from other participants in the group. True identity, as used herein, refers to information that can be readily used by a recipient to positively identify a sender of a message. For example, a person's full name would reveal his true identity. Additionally, a person's residential or business address, phone number, social security number, driver's license number, etc. may also directly or indirectly reveal his true identity. To prevent other participants on the network from knowing the user's true identity, the user may wish to have an alias associated with him such that the alias allows participants to converse with the user as if they knew his true identity without actually availing the user's true identity to those participants. As used herein, alias refers to any method, device, or technique associated with a user that is employed to mask that user's true identity while still allowing the user to identify himself in some unique manner to other users of the Internet or network. By way of example, if a user having a true identity of John Smith wishes to have an alias associated with his true identity, he may use another name to identify himself when communicating with others on the Internet. In this example, John Smith may use one or more names along the lines of MA_biker, handyman, cross_country, D1234, etc. as aliases when communicating over the Internet.

In order to facilitate group communication, employing an alias should be easy to do for an average Internet user. In addition, the alias should be secure, in that other users of the Internet cannot readily determine the true identity of the person associated with the alias. Current Internet technology places most of the burden associated with aliases on the user wishing to obtain one. This requires that the user be familiar with methods for generating secure aliases. Since many users may be unfamiliar with how to set up aliases, communication within groups is hindered. There exists a need for facilitating the formation of groups among persons sharing an interest. In addition, there is a need for a system and method that assists users with obtaining aliases without requiring them to have special knowledge about establishing them.

Furthermore, the aliases should be capable of random generation by a network device or administrator, or they should be selectable by a user to reflect his characteristics, hobbies, etc. in a manner that does not reveal his true identity.

SUMMARY OF THE INVENTION

The objects set forth above as well as further and other objects and advantages of the present invention are achieved by embodiments of the invention described hereinbelow.

In accordance with an aspect of the invention, a method is provided for connecting a plurality of customers sharing a common interest. The customers are connected using a domain which is accessible through a communications network. Furthermore, each of the plurality of customers has a billing address and account associated with a service provider which is further associated with the domain. The method further comprises notifying the plurality of customers about the domain by including information in a billing statement. A capability is provided to each of the plurality of customers allowing them to have access to the domain. At least a subset of the plurality is allowed to communicate with each other using the domain while keeping a true identity of each of the subset from being made available to others of the plurality of customers.

In accordance with yet another aspect of the invention, a system is provided for allowing a plurality of customers sharing a common interest to communicate over a network. The system further comprises a service provider having an account with each one of the plurality of customers. A domain associated with the service provider allows each of the plurality of customers to communicate with each other. A billing means associated with the service provider invoices each account, and a notification means associated with the billing means informs each of the customers about the domain. A server associated with the domain allows each of the plurality of customers to access the domain upon authentication. The system can further comprise an authentication means for allowing at least one of the plurality of customers to establish its identity; an associating means for mapping the identity to an alias associated with the at least one customer and making the alias available to the other of the plurality of customers having access to the domain while concealing the true identity of the at least one customer; storage means for archiving domain information about the at least one of the plurality of customers and allowing the other of the plurality of customers access to the domain; and an interaction means for allowing the other of the plurality of customers having access to the domain to communicate with each other and with the at least one of the plurality of customers using their respective aliases.

In still another aspect of the invention, a computer-readable medium containing a plurality of instructions that, when executed by at least one processor, causes the at least one processor to perform a method for connecting a plurality of customers associated with a service provider and further sharing a common interest through a communication network. The method further comprises providing a capability allowing the plurality of customers to have access to a domain associated with the service provider. Data from at least one of the plurality of customers is accepted. A true identity of the at least one of the plurality of customers based upon at least a portion of the data is verified. The true identity is mapped to an alias associated with the at least one of the plurality of customers. The domain is made available to the at least one of the plurality of customers, thus allowing the plurality of customers with access to the domain to have access only to the alias while keeping the true identity in confidence.

In yet a further aspect of the invention, a human-readable data display for displaying information about a domain having an address associated therewith is provided. Specifically, the information is provided to a customer associated with a service provider. The customer is notified about the domain address by the service provider through a billing statement. The domain is made available to the customer to facilitate communications with persons having a common interest with the customer. The data display further comprises a logon field for receiving input data from the customer where the input data is used to establish an identity of the customer; an alias field for displaying an alias associated with the customer and further being made available to persons having access to the domain and sharing the common interest with the customer; and a selection field for allowing the customer to choose a topic of interest where the topic of interest is linked to at least a subset of the persons sharing the common interest with the customer.

Other objects and advantages of the invention will become apparent hereinafter in view of the accompanying drawings and detailed description of the preferred embodiments of the present invention, the scope of which will be pointed out in the appended claims.

BRIEF DESCRIPTION OF THE DRAWINGS

The accompanying drawings illustrate a preferred embodiment of the invention and are incorporated in and constitute a part of this specification. In the drawings, FIG. 1 contains a block diagram illustrating an exemplary system employing a communication network useful for practicing embodiments of the invention.

DETAILED DESCRIPTION OF THE INVENTION

To provide an overall understanding of the present invention, certain illustrative embodiments will now be described. However, it will be understood by one of ordinary skill in the art that the systems and methods described herein can be adapted and modified to provide for other suitable applications. Other additions and modifications can be made without departing from the scope of systems and methods described herein.

Unless otherwise specified, the illustrated embodiments can be understood as providing exemplary features of varying detail of certain embodiments. Therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and, unless otherwise specified, can be altered without affecting the disclosed systems or methods.

FIG. 1

Figure 1:
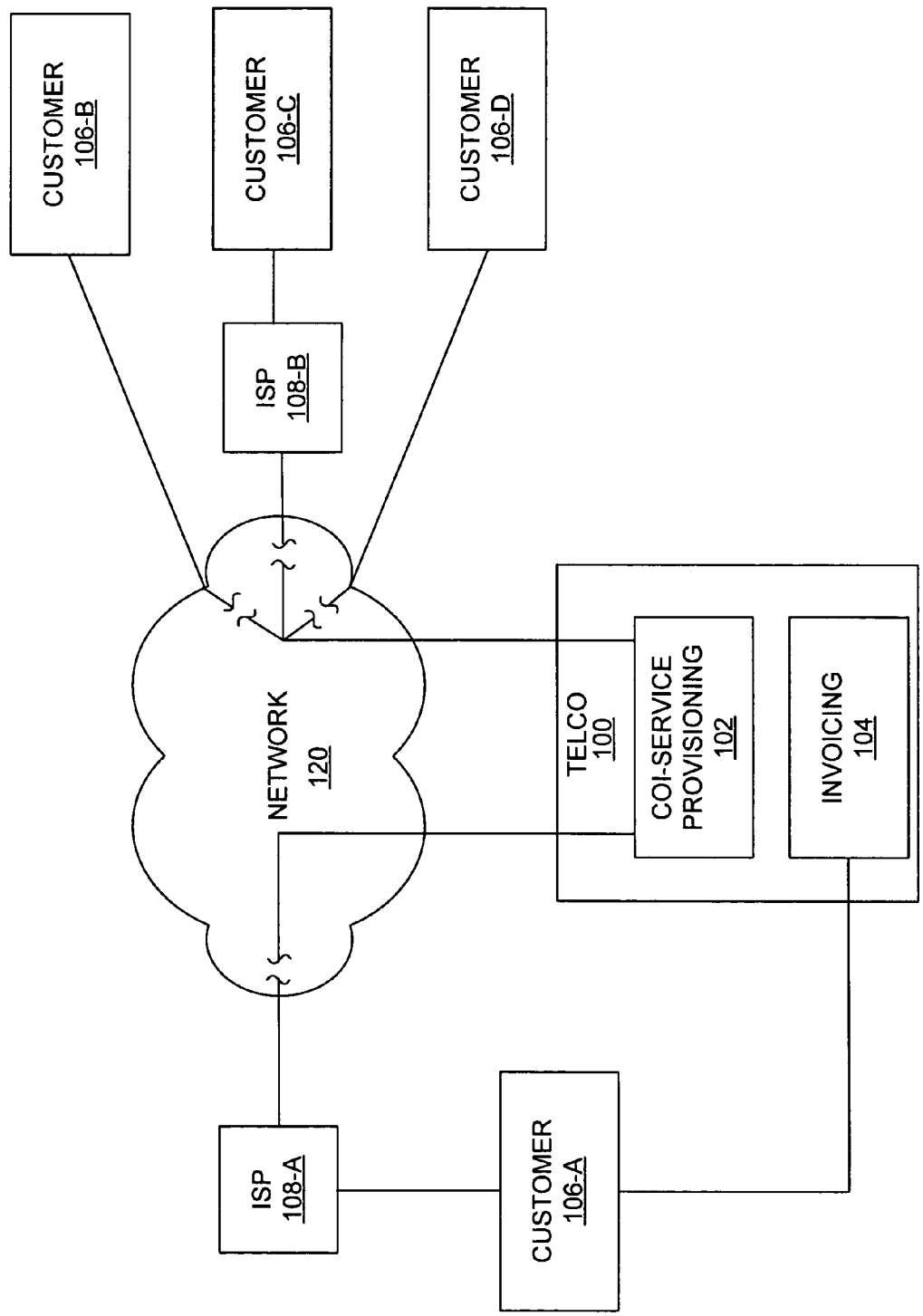

FIG. 1 contains an exemplary system configuration for practicing a preferred embodiment of the invention. The system of FIG. 1 comprises a telecommunications or service provider (telco) 100, including among other things a community of interest (COI) provisioning module 102 and an invoicing module 104, customers 106 A-D, Internet service providers (ISPs) 108 A and B, and network 120.

Telco 100 is typically a company or agency providing telephone based communication services to customers. Examples of communication services provided by telco 100 are, but are not limited to, landline based telephone service, wireless telephone service, wireless based text and data services, digital subscriber line (DSL) communication services, and integrated services digital network (ISDN) services. In other embodiments, telco 100 may also, or instead, provide data communication services to customers such as Internet protocol (IP), asynchronous transfer mode (ATM), frame relay, synchronous optical network (SONET), and the like. Telco 100 may comprise COI module 102 and an invoicing module 104. COI module 102 may be used to facilitate communication among a group of users sharing a common interest. As used herein, COI refers to any grouping of individuals and/or organizations desiring to communicate with other individuals or organizations having at least one interest in common. COI module 102 handles setup and oversees operation of the actual COI service utilized by users having access thereto. COI module 102 may further comprise other components or subsystems not shown in FIG. 1, such as one or more servers, databases, communication interfaces, etc.

Invoicing module 104 facilitates operations necessary for billing customers for communication services provided thereto. Customers may be billed electronically or through more conventional means, such as a paper billing statement sent through the mail. Invoicing module 104 may be comprised of hardware and/or software configured to receive information necessary for generating invoices from other systems associated with telco 100, such as an accounting module (not shown) for tabulating charges associated with selected accounts, a provisioning module (not shown) for provisioning telecommunication services to customers and tracking usage, a database module (not shown) for storing and organizing information associated with customers, etc.

Customers 106 A-D may include individuals, companies, organizations, and the like having accounts with telco 100 and further receiving communication services in connection with those accounts. For brevity of presentation, customers 106 A-D will generally be referred to collectively as customer 106 with the following exceptions: customer 106A is a customer desiring to join the COI service, and customer 106B is a customer already associated with, or belonging to, a particular COI.

ISPs 108A and B may be used by one or more individuals or entities wishing to connect a network such as the Internet. ISPs 108 A and B provide connectivity services to locations, such as customer 106A, for facilitating connection to network 120. Connections between customer 106 and ISP 108 may be over a conventional telephone line, optical fiber, free space optical link, wireless link, or the like. In some instances, ISP 108 may provide only a connection to network 120, while in other instances, ISP 108 may provide other services or utilities to customer 106 in addition to network connectivity. For example, ISP 108 may provide instant messaging, access to news files, online calendar functions, etc. Customer 106 may also connect directly to network 120 without using ISP 108.

Network 120 may be any type of communications network capable of carrying analog or digital data. In embodiments of the invention, network 120 may be a conventional telephone network, also known as plain old telephone network (POTS), or a data network such as the Internet. Network 120 is capable of handling a plurality of traffic streams through links, dedicated or shared, serving a plurality of customer 106. Connections to network 120 can be hardwired or wireless, including free space optical. Network 120 may further include networking devices for facilitating movement of traffic such as routers, hubs, switches, gateways, central offices, firewalls, intrusion detection systems, etc.

FIG. 2

Figure 2:
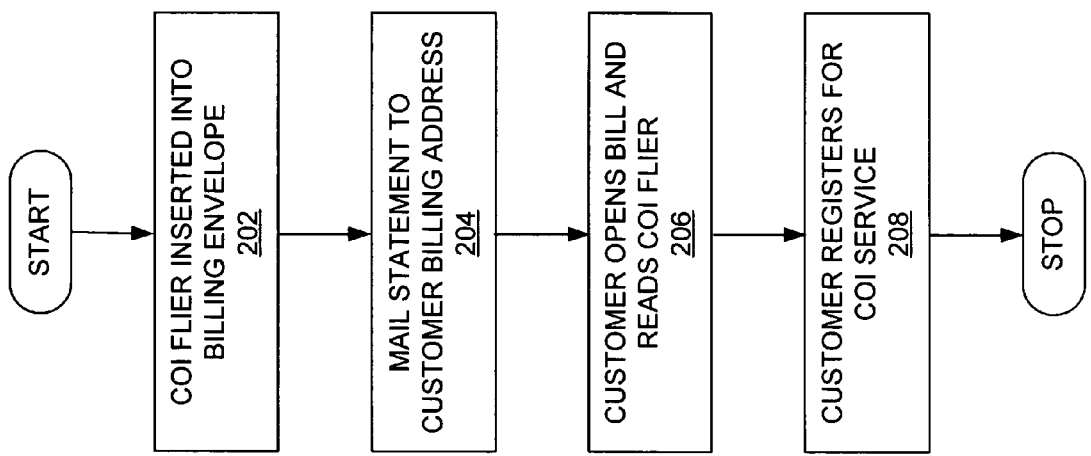
FIG. 2 contains a flow diagram illustrating an exemplary method for notifying a user.

FIG. 2 illustrates an exemplary method, or process, for notifying customer 106A about the existence of a COI service. In step 202, telco 100 may generate a bill for customer 106A using invoicing module 104 and a COI flyer may be inserted into a billing envelope along with the billing statement for services rendered to customer 106A. In FIG. 2, the notification is in the form of a flyer inserted into an envelope. This manner of notification is applicable if the bill is sent using the Postal Service; however, the notification may take other forms such as a pop-up window, email, browser window, facsimile printout, etc. when the bill is sent electronically. As used herein, the notification from telco 100 to customer 106A will generally be referred to as a COI flyer.

In step 204, telco 100 mails the envelope containing the billing statement and COI flyer to customer 106A using the address associated with the customer. In step 206, customer 106A opens the envelope and reads the COI flyer. The COI flyer contains information explaining the COI service and procedures for accessing it. For example, the COI flyer may contain a description of a COI service and examples of COI groups currently available, along with a brief description of the interest(s) shared among members of the groups. In addition, the flyer may contain information necessary for accessing or registering for the service, such as a universal resource locator (URL).

In step 208, customer 106A may go to a URL associated with the COI flyer to register for the service. Further registration instructions may be provided at the web site associated with the COI service. COI registration will be further explained in connection with FIG. 3.

FIG. 3

Figure 3:
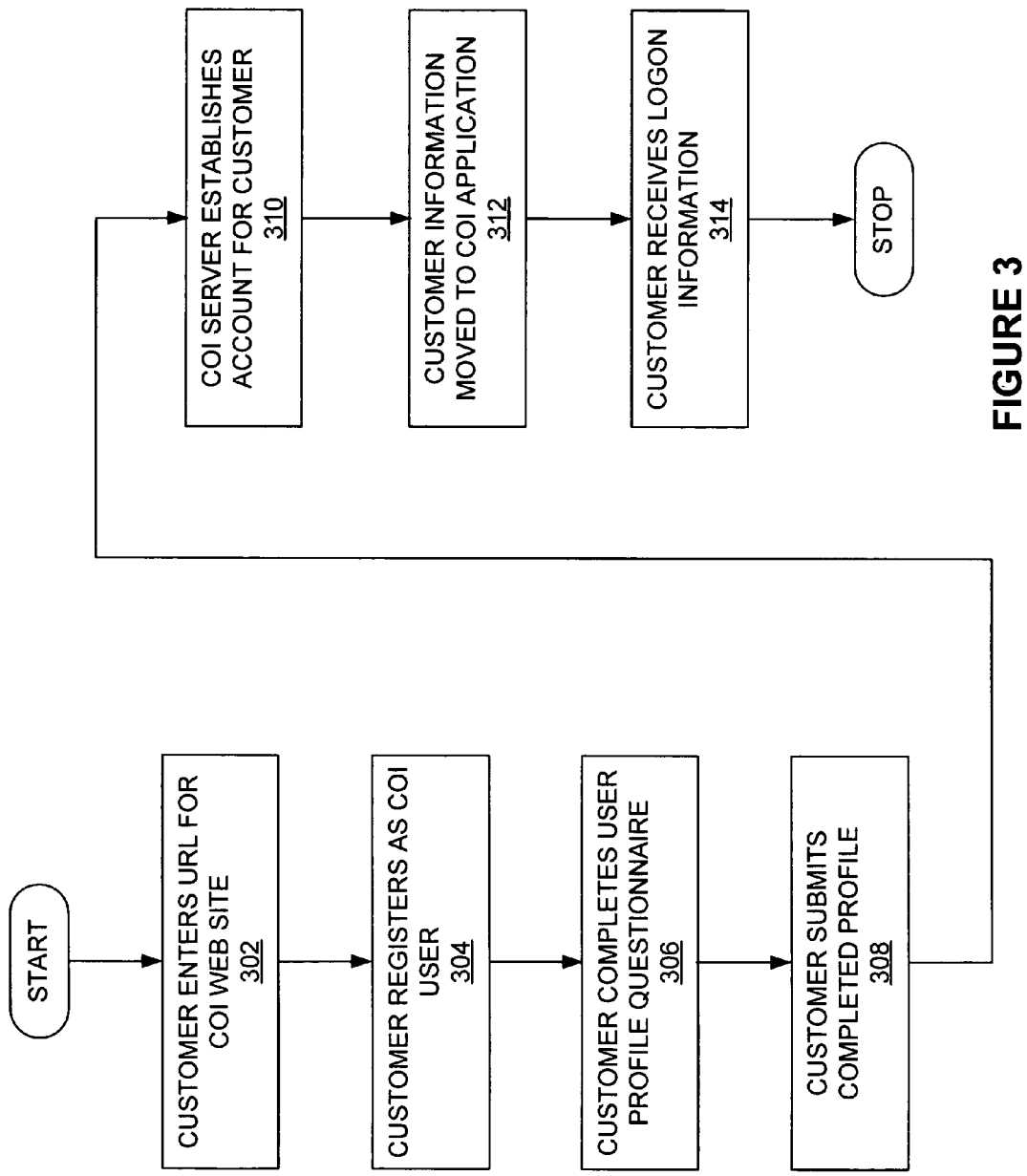
FIG. 3 contains a flow diagram illustrating an exemplary method for registering with the community of interest service.

The exemplary registration process described in step 208 of FIG. 2 is illustrated in greater detail in FIG. 3. In step 302, customer 106A enters the URL contained in the COI flyer, which directs customer 106A to the home page for the COI service. In step 304, at the COI home page, customer 106A registers as a COI user. COI registration begins with step 304 and ends with step 308. In step 306, customer 106A completes a user profile questionnaire. The questionnaire may ask customer 106A about areas of interest, educational background, geographic preferences for COI groups, work experience, family information, hobbies, etc. Information entered at step 306 will be used by the COI service to facilitate associating customer 106A with other customers, such as customer 106B, in a manner acceptable to both customer 106A and customer 106B. After customer 106A has completed the profile, it may be submitted to the COI server in step 308.

In step 310, the COI server receives the completed profile from customer 106A and uses information contained therein to establish an account for the customer. The customer's information is then moved to the COI application in step 312. After establishing the customer's account, logon information is sent and/or presented to customer 106A in step 314. Logon information may be sent to customer 106A via email, via information displayed in a web browser display, mailed to customer 106A's residence, etc. Customer 106A is able to use the COI service after the logon information has been received.

FIG. 4

Figure 4:
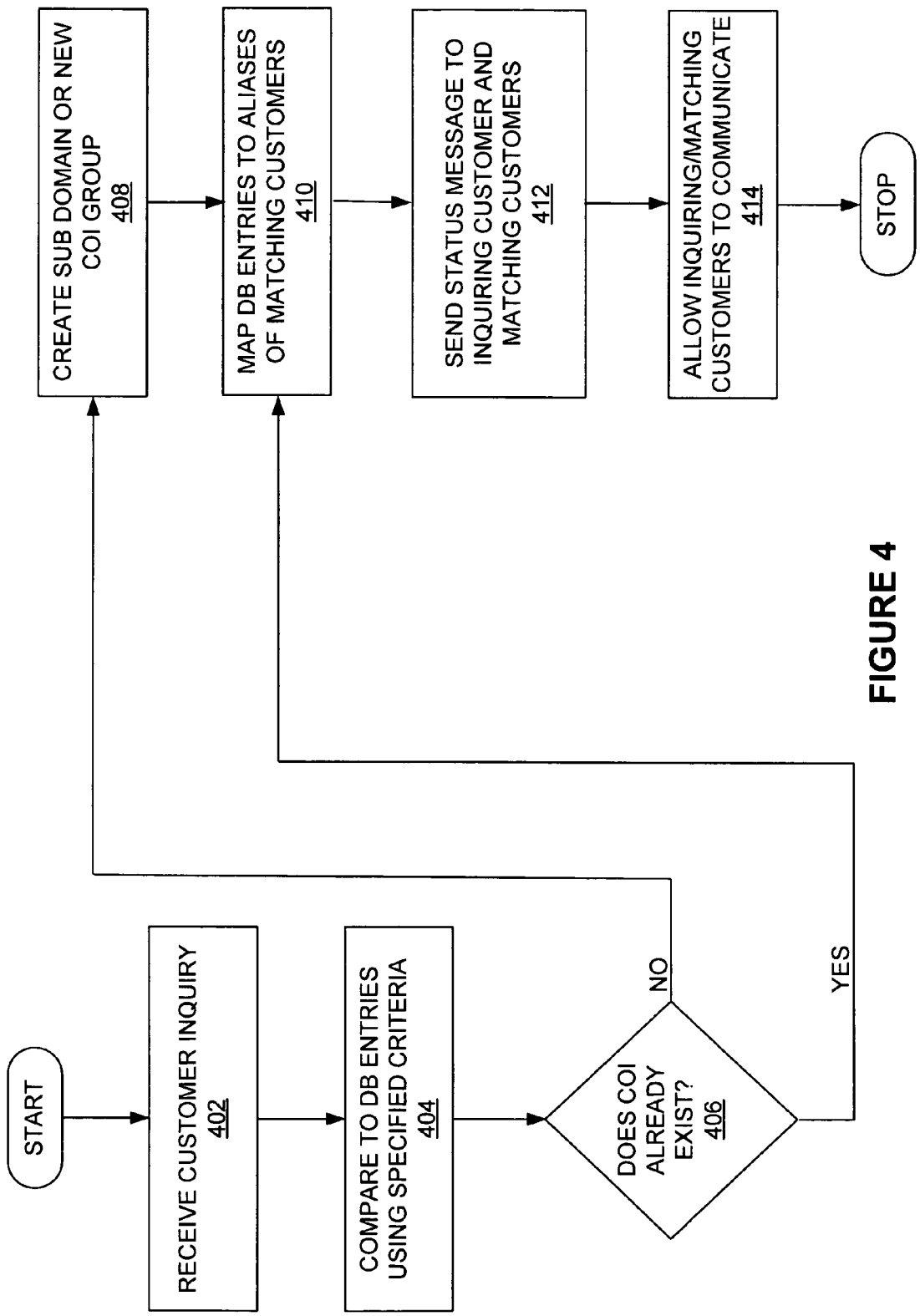
FIG. 4 contains a flow diagram illustrating an exemplary method for utilizing the community of interest service to communicate with a group.

FIG. 4 illustrates an exemplary method for allowing customer 106A to use the COI service to communicate with persons sharing a common interest, such as, for example, customer 106B. The COI server receives an inquiry from customer 106A in step 402. Customer 106A may issue the request via a general-purpose computer coupled to network 120 and running a web browser. Customer 106A may have to enter logon information such as a true identity and password to gain access to the COI server executing the COI application before having his inquiry processed. For example, customer 106A may have specified or selected rose gardening groups within 10 miles of his hometown. Since the COI application has access to customer 106A's home address by way of invoicing module 104, it can compare the inquiry and related information to other database entries in step 404. In step 406, the COI application determines if a COI already exists by searching a computer-readable database containing information about COI's already formed. If a COI already exists, the application maps users belonging to the COI to their respective aliases in step 410. If, however, a COI does not exist, the application may create a new COI, or domain, associated with the criteria specified by customer 106A as shown in step 408. In this case, customer 106A will be the first person associated with the new COI, and will be the first database entry to be mapped to a respective alias. At step 412, a status message is generated and sent to all members associated with the COI identified by customer 106A's inquiry. The status message may be sent to customer 106A as confirmation that he has successfully joined the group, or it may only be sent to those persons already associated with the COI in order to let them know that a new member has joined the group. In step 414, customer 106A and the other persons associated with the COI may communicate with each other using their respective aliases. If the application provides services in addition to basic communication services such as email (for example, by establishing a special web site for the respective COI to use), then that information can also be included in the status message so that members can access the site.

FIG. 5

Figure 5:
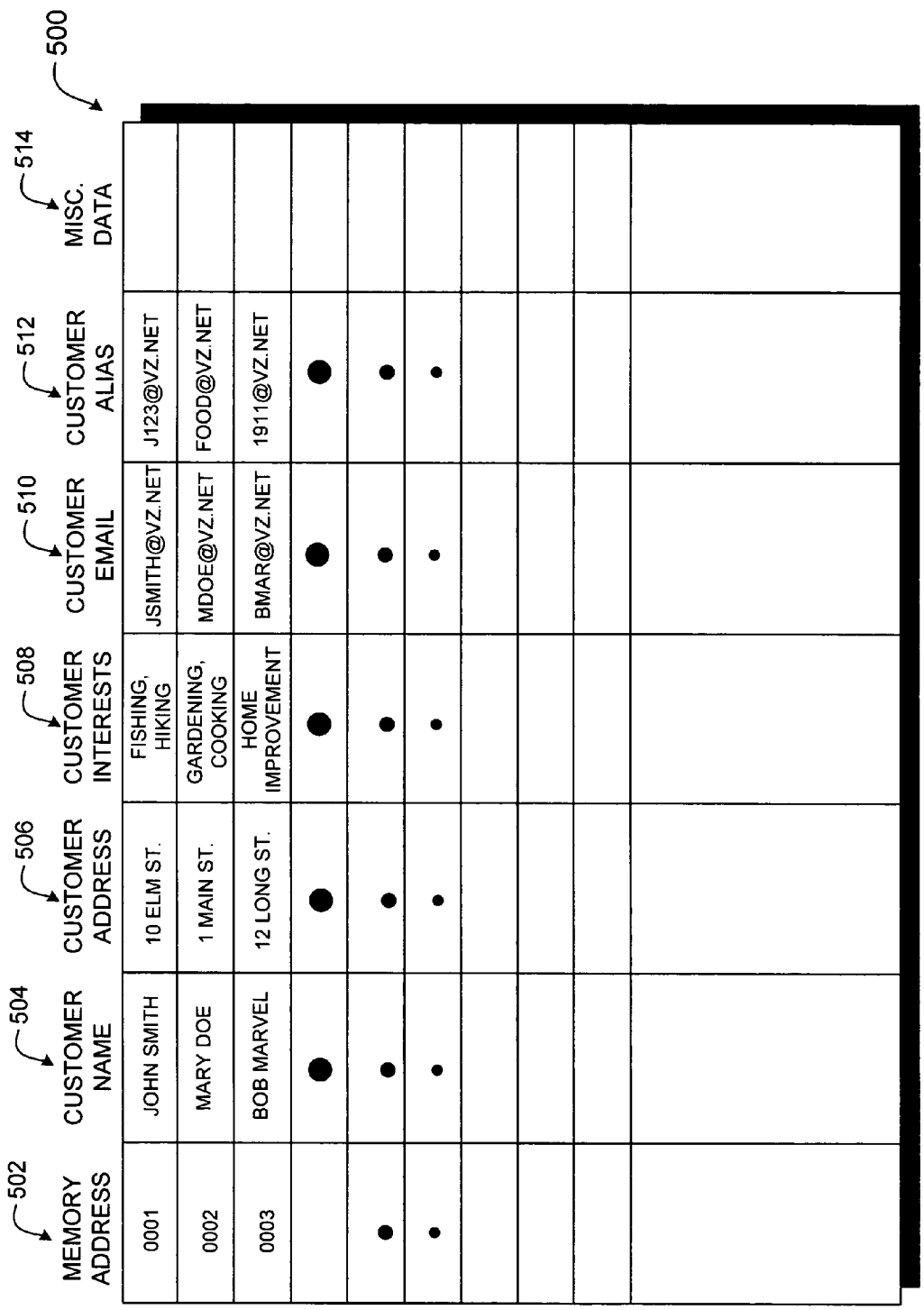
FIG. 5 contains an exemplary data structure residing in a computer-readable memory for storing information associated with a community of interest service.

FIG. 5 illustrates an exemplary data structure, or record, for storing information associated with a COI service on a computer such as a COI server. Data structure 500 may comprise a plurality of fields, such as memory address 502, customer name 504, customer address 506, customer interests 508, customer email 510, customer alias 512, and miscellaneous data 514. Memory address 502 may indicate a position, or address, in a computer-readable memory where information associated with a particular customer 106 may be stored. Customer name 504 may be used to represent the true identity of a customer associated with the COI service. Customer address 506 may be used to represent the billing address associated with customer name 504. Customer interests 508 may be used to represent information associated with areas or topics of interest expressed by customer 106. Customer email 510 may be used to represent one or more email addresses associated with customer name 504. Customer alias 512 may be used to represent information identifying the alias assigned to customer 106. Customer alias 512 may contain an alias such as J123, Food, or 1911 identifying a particular customer. Also, the field may contain additional information, such as an email address associated with the alias wherein the aliased email address is capable of preventing discovery of the customer's true identity. Miscellaneous data 514 may contain further information useful to the COI server and/or COI application when performing functions associated with hosting and administering a COI service. For example, miscellaneous data 514 may contain links to other domains or sub-domains to which a customer identified in customer name 504 belongs and/or additional information about the customer, such as social security number, work address, and the like.

FIG. 6

Figure 6:
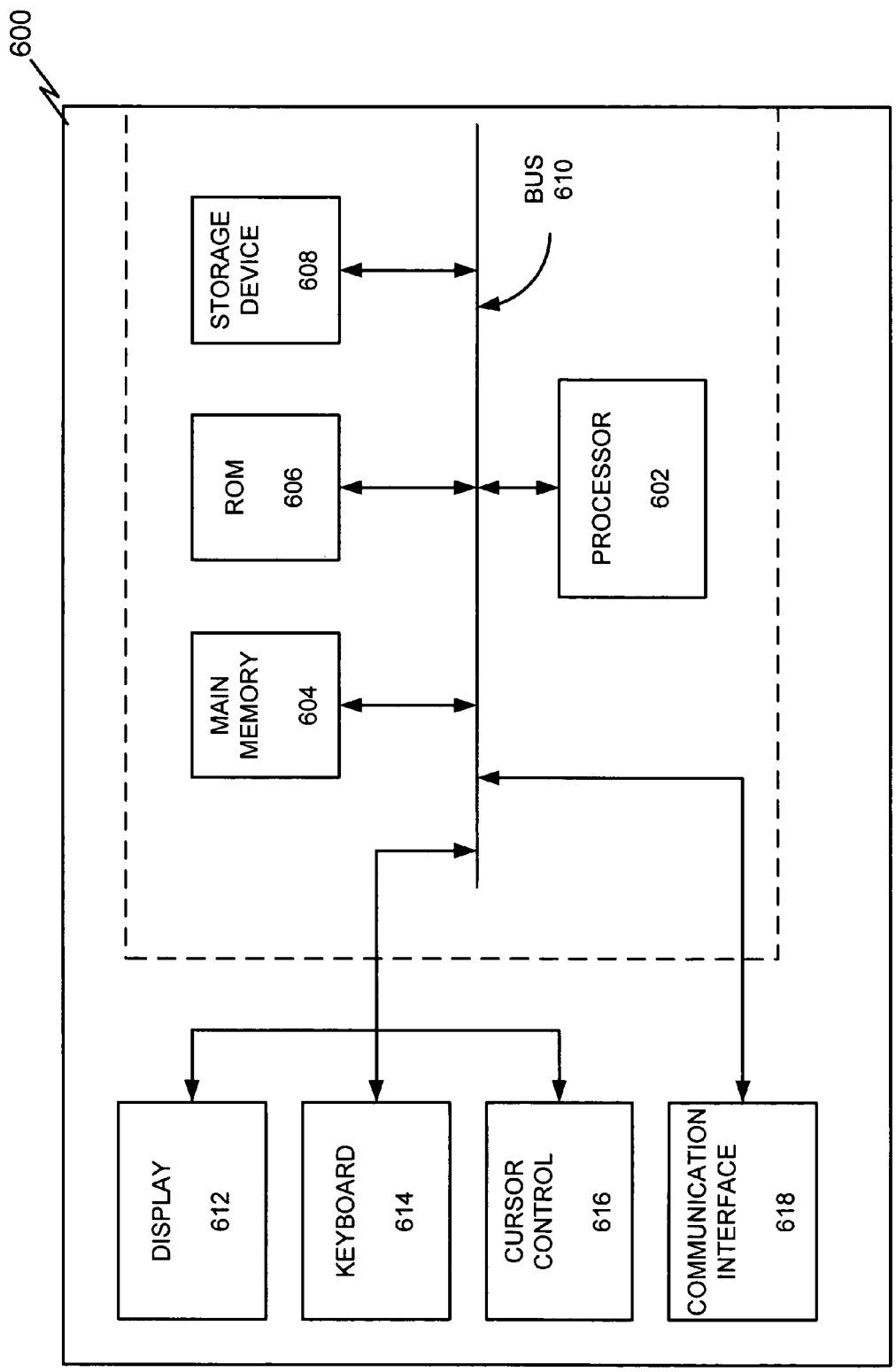
FIG. 6 contains a block diagram of an exemplary architecture for a general purpose computer configurable for practicing embodiments of the invention.

FIG. 6 illustrates an exemplary processor-controlled device, here a general-purpose computer, that can be configured using hardware and/or software to implement embodiments of the invention. For methods and systems described herein, a processor (computer) can be understood to be a processor-controlled device that can include, for example, a PC, workstation, handheld, palm, laptop, cellular telephone, or other processor-controlled device that includes instructions for causing the processor to act in accordance with the disclosed methods and systems. References to "a processor" or "the processor" can be understood to include one or more processors that can communicate in a stand-alone and/or a distributed environment(s) and can thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device or external to the processor-controlled device, and can be accessed via a wired or wireless network using a variety of communications protocols, and unless otherwise specified, can be arranged to include a combination of external and internal memory devices, where such memory can be contiguous and/or partitioned based on the application.

The exemplary computer 600 includes processor 602, main memory 604, read only memory (ROM) 606, storage device 608, bus 610, display 612, keyboard 614, cursor control 616, and communication interface 618. Processor 602 may be any type of conventional processing device that interprets and executes instructions. Main memory 604 may be a random access memory (RAM) or a similar dynamic storage device. Main memory 604 stores information and instructions to be executed by processor 602. Main memory 604 may also be used for storing temporary variables or other intermediate information during execution of instructions by processor 602. For example, main memory 604 may store portions of data structure 500 when operating as a COI server. ROM 606 stores static information and instructions for processor 602. It will be appreciated that ROM 606 may be replaced with other types of static storage devices without departing from the spirit of the invention. Data storage device 608 may include any type of magnetic or optical media and its corresponding interfaces, drivers, and operational hardware. Data storage device 608 stores information and instructions for use by processor 602. In a preferred embodiment, bus 610 includes a set of hardware lines (conductors, optical fibers, or the like) that allow for data transfer among the components of computer 600; however, in alternative embodiments, bus 610 may include wireless means (RF or free-space optical) for transferring data among components of computer 600.

Display device 612 may be a cathode ray tube (CRT), liquid crystal display (LCD), flat plasma display, or the like for displaying information to a user or COI administrator. Keyboard 614 and cursor control 616 allow a user to interact with computer 600. Cursor control 616 may be, for example, a mouse. In an alternative configuration, keyboard 614 and cursor control 616 can be replaced with a microphone and voice recognition means to allow a user to interact with computer 600 in a hands-free manner.

Communication interface 618 enables computer 600 to communicate with other devices/systems via any communications medium. For example, communication interface 618 may be a modem, an Ethernet interface to a LAN, or a printer interface. Alternatively, communication interface 618 can be any other interface that enables communication between computer 600 and other devices or systems.

By way of example, a computer 600 consistent with the present invention may make a COI service available to customer 106 using network 120. Computer 600 performs operations necessary to complete desired actions in response to processor 602 executing sequences of instructions contained in, for example, memory 604. Such instructions may be read into memory 604 from another computer-readable medium, such as a data storage device 608, or from another device via communication interface 618. Execution of the sequences of instructions contained in memory 604 causes processor 602 to perform operations such as those described in connection with FIGS. 3 and 4, such as making a customer profile questionnaire available via network 120, establishing a customer account, associating customer information with the COI application, processing customer logon attempts, establishing a domain to allow customers sharing an interest to communicate, and mapping a customer's true identity to an alias. In alternative embodiments of computer 600, hard-wired circuitry may be used in place of or in combination with software instructions to implement the present invention. Thus, the present invention is not limited to any specific combination of hardware circuitry and software.

FIG. 7

Figure 7:
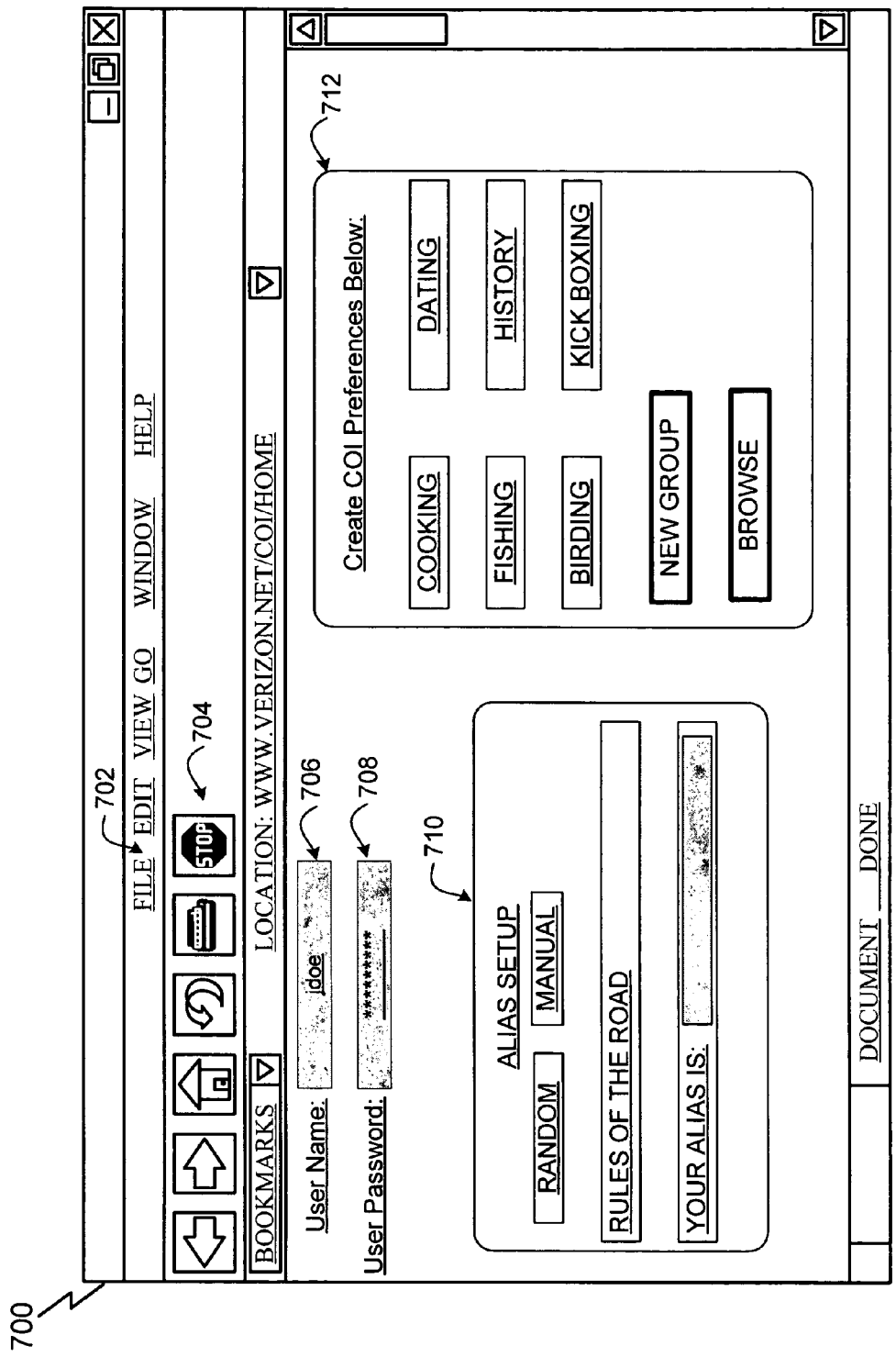
FIG. 7 contains an exemplary computer "screen-shot" display useful for practicing embodiments of the invention.

FIG. 7 illustrates an exemplary human-readable data display or computer terminal screen ("screen-shot") useful for practicing embodiments of the invention. Data display 700 may comprise menu fields 702, shortcut buttons 704, user name field 706, user password field 708, registration window 710, and preferences window 712. Data display 700 may be implemented using a general-purpose computer executing machine-readable instructions such as that shown and described in connection with FIG. 6. Menu fields 702 may provide customer 106 with an expedient means for accessing functionality associated with computer 600 and/or network 120. For example, clicking on FILE using a mouse or other pointing means may cause a drop-down menu to appear. The drop-down menu may comprise functionality such as print commands for printing information on data display 700, properties command for allowing customer 106 to view operating parameters of hardware and software applications running on computer 600, etc. Shortcut buttons 704 may provide customer 106 with a one-click means for accessing additional functionality associated with computer 600 and the COI application. For example, clicking on one of the plurality of shortcut buttons 704 may allow customer 106 to return to a previously viewed display or screen and clicking on another of shortcut buttons 704 may allow customer 106 to stop data from being transmitted from/to a COI server.

User name field 706 provides customer 106 with a means for entering his true identity, and user password field 708 provides a means for entering a password known only to the customer associated with the true identity. Registration window 710 may occupy a portion of the display area and contain information to facilitate registration with COI service provisioning module 102. By way of example, registration window 710 may contain means for establishing an alias. COI service provisioning module 102 may choose an alias for customer 106A using a random generator or other means. Alternatively, COI service provisioning module 102 may allow customer 106A to choose an alias using a manual option. Registration window 710 may also contain help instructions in text, video, audio, or combination thereof to assist customer 106A with registering and setting up his COI service. Finally, the alias assigned to customer 106A may be displayed. In addition to displaying the alias to customer 106A using data display 700, COI service provisioning module 102 may convey registration information to customer 106A using other means such as email, voice mail, confirmation letter, etc.

Preferences window 712 may display information pertaining to community-of-interest (COI) groups that customer 106A has selected. Buttons within preferences window 712 may provide one-click access to domains associated with respective COI groups already in existence such as, for example, cooking, dating, and fishing in FIG. 7. Preferences window 712 may also contain a button for creating a new group in situations where customer 106A does not find an existing COI group satisfying his criteria. A browse button may also be provided to allow customer 106A to search through existing COI groups. In an embodiment of the invention, clicking on a button, such the browse button, may open a popup window containing descriptions of existing COI groups, links to domains associated with those groups, etc.

Additional fields, windows, and information may be added to data display 700 without departing from the spirit of the invention.

The methods and systems described herein are not limited to a particular hardware or software configuration and may find applicability in many computing or processing environments. The methods and systems may be implemented in either hardware or software, or a combination of both hardware and software. Furthermore, the methods and systems can be implemented in one or more computer programs, where a computer program can be understood to include one or more processor executable instructions. The computer program(s) can execute on one or more programmable processors and can be stored on one or more storage media readable by the processor (including volatile and non-volatile memory and/or storage elements), one or more input devices, and/or one or more output devices. The processor thus can access one or more input devices to obtain input data and can access one or more output devices to communicate output data. The input and/or output devices can include one or more of the following: Random Access Memory (RAM), Redundant Array of Independent Disks (RAID), floppy drive, Compact Disk (CD), Digital video Disk (DVD), magnetic disk, internal hard drive, external hard drive, memory stick, or other storage device capable of being accessed by a processor as provided herein, where such aforementioned examples are not exhaustive, and are for illustration and not limitation.

The computer program(s) is preferably implemented using one or more high level procedural or object-oriented programming languages to communicate with a computer system; however, the program(s) can be implemented in assembly or machine language, if desired. The language can be compiled or interpreted.

The processor(s) can thus be embedded in one or more devices that can be operated independently or together in a networked environment, where the network can include, for example, a Local Area Network (LAN), wide area network (WAN), and/or an intranet and/or the internet and/or another network. The network(s) can be wired or wireless or a combination thereof and can use one or more communications protocols to facilitate communications among the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, or another device capable of being integrated with a processor(s) that can operate as provided herein. Accordingly, the devices provided herein are not exhaustive and are provided for illustration and not limitation.

Although the methods and systems have been described relative to a specific embodiment thereof, they are not so limited. Obviously many modifications, variations and alternative embodiments may become apparent in light of the above teachings. For example, references to databases can include data associated in a manner which facilitates the disclosed methods and systems, and can include other data structures that can be stored in contiguous and/or non-contiguous memory that can be accessed internally and/or externally using wired and/or wireless communications.

In a first alternative embodiment, customer 106A may access COI service provisioning module 102 via a wireless connection initiated from a PDA. COI service provisioning module 102 may then process the request using a workstation running, for example, a Unix operating system. The server may in turn access one or more data structures 500 residing in non-contiguous memory residing across multiple geographic locations. For example, the address of customer 106A may reside in a first data structure at a first location operating in connection with invoicing module 104, while the alias associated with customer 106A may reside in a second data structure located at a second location and operating in conjunction with a COI application.

In a second alternative embodiment, customer 106A may express a preference for a particular topic of interest. Service provisioning module 102 may receive the preference and automatically assign customer 106A to a local group having members sharing that preference. By way of example, customer 106A may express a preference for rose gardening. Service provisioning module 102 may then automatically assign customer 106A to an existing group of rose gardeners located in customer 106A's home town.

In a third alternative embodiment, telco 100 may advertise its service to customers of other service providers such as other telcos and ISPs. These other customers are herein referred to as "outside customers". Outside customers can then participate in the COI service offered by telco 100. Allowing outside customers to join the COI service may serve to increase the diversity of and overall number of participants subscribing to the COI service. In addition, having outside customers participate in the COI service may also serve as a recruitment tool for other services offered by telco 100. Recruitment may be accomplished by informing outside customers about other services offered by telco 100 and/or by offering discounts to outside customers that enroll for these services through the COI service.

Many additional changes in the details, materials, and arrangement of parts herein described and illustrated can be made by those skilled in the art. Accordingly, it will be understood that the following claims are not to be limited to the embodiments disclosed herein, can include practices other than those specifically described hereinabove, and are to be interpreted as broadly as allowed under the law.

What is claimed is:

1. A computer-implemented method for connecting no more than a plurality of customers using a domain accessible through a communications network, each of said plurality having a billing address and an account associated with a service provider, said service provider communicatively linked to said domain, said method comprising:
    notifying said each of said plurality about said domain by including information in a billing statement for said each of said plurality;
    providing said each of said plurality with access to said domain;
    providing said each of said plurality with a customer profile questionnaire;
    receiving responses to said questionnaire from at least a portion of said plurality of customers;
    receiving an inquiry about a community of interest (COI) from one customer in said portion;
    determining existence of said COI with which other customers in said portion are associated;
    sending by operation of said computer a generated status message to only said other customers, if said COI exists, as confirmation that said one customer has joined said COI; and
    allowing at least a subset of said portion of said plurality of customers giving common answers to said questionnaire, to communicate with each other using said domain while not disclosing true identity of each customer of said subset to others of said plurality, said subset comprising said one customer and said other customers.

2. The method of claim 1 wherein said notifying further includes mailing said billing statement to each of said plurality.

3. The method of claim 2 wherein said notifying further includes providing said plurality with a universal resource locator (URL), said URL for allowing said plurality access to said domain.

4. The method of claim 1 wherein said access means includes a server associated with a URL and made available to said plurality of customers, said server facilitating access to said domain by said plurality.

5. The method of claim 1 wherein said addresses are used in establishing said subset of said plurality.

6. The method of claim 1 wherein said domain is only accessible to those of said plurality sharing a common interest.

7. The method of claim 6 wherein said providing further requires that said each of said plurality enter a password to gain access to said domain.

8. The method of claim 1 further comprising:
    sending a generated status message to said one customer, if said COI does not exist, as confirmation that said customer has successfully joined a new COI.

9. A system for allowing no more than a plurality of customers to communicate over a network, said system comprising:
    a service provider having an account with each of said plurality;
    a domain associated with said service provider;
    billing means controlled by said service provider for invoicing each said account,
    notification means associated with said billing means for informing said each of said plurality about said domain and for providing said each of said plurality with a customer profile questionnaire;
    means for receiving responses to said questionnaire from at least a portion of said plurality and for allowing at least a subset of said portion of said plurality giving common answers to said questionnaire to communicate with each other using said domain, wherein said receiving and allowing means includes means for receiving an inquiry about a community of interest (COI) from one customer of said subset, means for determining existence of said COI with other customers of said subset belonging to said COI, and means for sending a generated status message to only said other customers as confirmation that said one customer has joined said COI; and
    a server associated with said domain for allowing said each of said subset to access said domain upon authentication.

10. The system of claim 9 wherein said server further comprises:
    authentication means for allowing each of said one customer and said other customers of said subset to establish its respective identity; and
    associating means for mapping each said respective identity to an alias randomly-generated and chosen by said server and associated with its respective customer of said subset, said alias being made available to all other customers of said subset having access to said domain, said alias further concealing true identity of said respective customer of said subset;

storage means for archiving said domain and information about said one customer of said subset and said other customers of said subset having access to said domain; and interaction mea for allowing said other customers of said subset having access to said domain to communicate with each other and with said one customer of said subset using their respective aliases.

11. A computer-readable medium containing a plurality of instructions that, when executed by at least one processor, causes said at least one processor to perform a method for inter-connecting through a communications network no more than a plurality of customers who are associated with a service provider, said method comprising:

providing each of said plurality of customers with a customer profile questionnaire;

receiving responses to said questionnaire from at least a portion of said plurality of customers;

allowing a subset of said portion of said plurality of customers giving common answers to said questionnaire to have access to a domain associated with said service provider;

accepting data from at least one of said subset of said portion of said plurality of customers, verifying a true identity of said at least one of said subset of said portion of said plurality of customers based upon at least a portion of said data;

mapping said true identity to an alias associated with said at least one of said subset of said portion of said plurality of customers; and allowing others of said subset of said portion of said plurality of customers with access to said domain to have access only to said alias while keeping said true identity in confidence;

wherein said at least one customer of said subset inquires about a community of interest (COI), said COI is determined to exist with certain customers of said subset belonging to said COI, and a status message is generated and sent to only said certain customers as confirmation that said at least one inquiring customer has joined said COI.

12. The method of claim 11 further comprising:
notifying, said plurality of customers about said domain by including information in a billing statement associated with said service provider.

13. The method of claim 11 further including storing said domain and information about those of said plurality of customers having, access to said domain.

14. The method of claim 11 wherein said allowing said domain access and said allowing said alias access include a server coupled to said communications network.

15. The method of claim 14 wherein said at least one of said plurality of customers uses a web browser to access said domain.

16. A computer-implemented method for enabling each customer in a plurality of customers of a service provider to determine if other customers in said plurality have one or more interests in common with said each customer and to anonymously communicate over a network with certain of said other customers having said interests in common, said method comprising:

notifying said each customer by way of its respective billing statement from said service provider about a common domain in said network over which anonymous communication may take place and providing said each customer with a customer profile questionnaire;

receiving responses to said questionnaire from at least a portion of said plurality of customers;

providing a subset of said portion of said plurality of customers giving common answers to said questionnaire with access to said domain and giving each in said subset access to information about said interests of said other customers in said subset to permit said anonymous communication between said each customer in said subset and said other customers in said subset, said anonymous communication resulting from aliases each generated randomly by a server for, respectively, a different one of said subset of customers, whereby said each customer in said subset knows said aliases and not true identities of said other customers in said subset;

permitting each in said subset to inquire about a respective community of interest (COI);

determining existence or non-existence of said COI;

sending, by operation of said computer, if said COI exists, a generated status message only to others of said subset who belong to said COI as confirmation that said inquiring customer has joined said COI, and sending, by operation of said computer, if said COI does not exist, a different generated status message to said inquiring customer signifying that said inquiring customer has successfully joined a new COI.

* * * * *